Oct. 13, 1925.
E. A. CONWAY
CHALK LINE
Filed Oct. 25, 1923
1,557,031
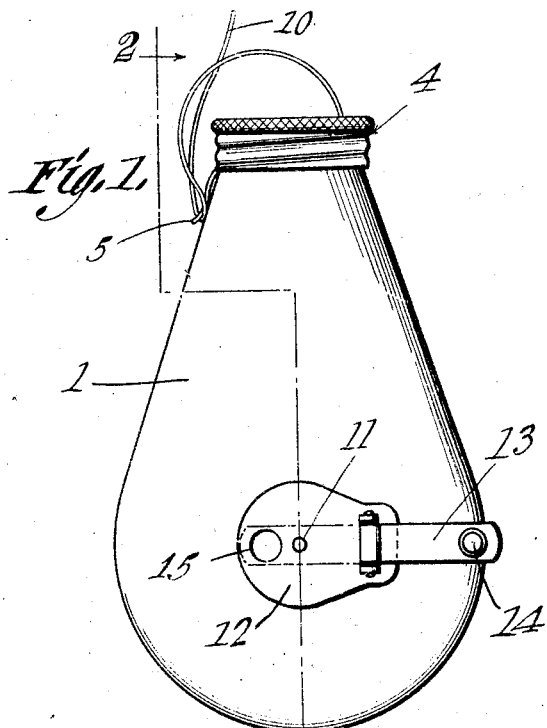
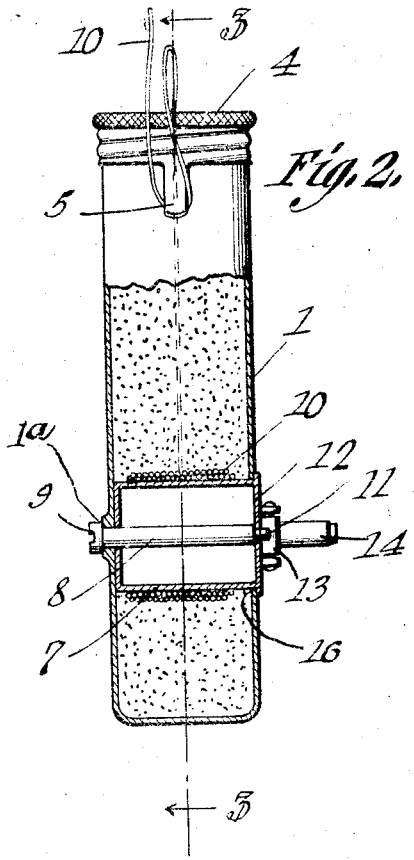
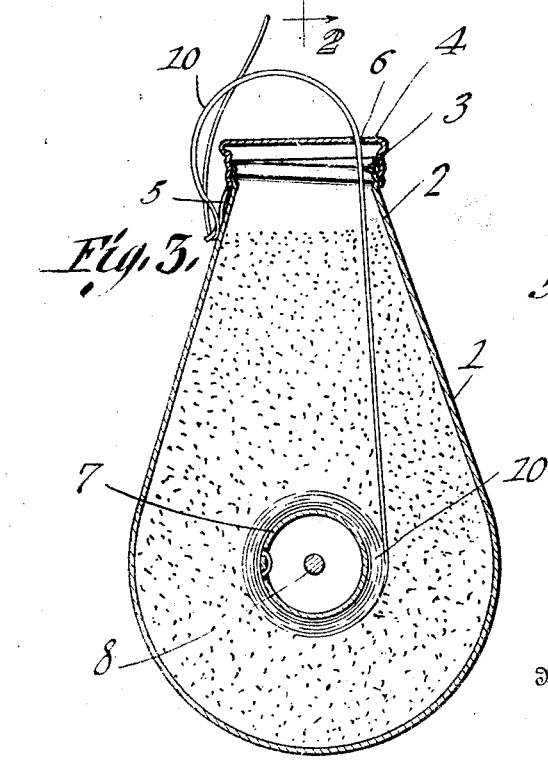
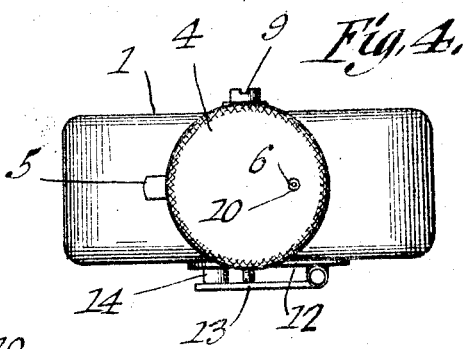
E. A. Conway, Inventor Patented Oct. 13, 1925.

1,557,031

UNITED STATES PATENT OFFICE.

ELISHA ASBURY CONWAY, OF WILLIAMSPORT, PENNSYLVANIA.

CHALK LINE.

Application filed October 25, 1923. Serial No. 670,738.

*To all whom it may concern:*

Be it known that I, ELISHA A. CONWAY, a citizen of the United States, residing at Williamsport, in the county of Lycoming and State of Pennsylvania, have invented a new and useful Chalk Line, of which the following is a specification.

This invention relates to self-chalking chalk lines in which the line is wound on a reel enclosed in a casing containing powdered chalk.

The object of the invention is to provide a holder of this character which may be cheaply constructed and has no springs to get out of order or become choked with the powder used for chalking the line.

With the foregoing and other objects in view which will appear as the description proceeds, the invention resides in the combination and arrangement of parts and in the details of construction hereinafter described and claimed, is being understood that changes in the precise embodiment of the invention herein disclosed, may be made within the scope of what is claimed without departing from the spirit of the invention.

In the accompanying drawings:—

Figure 1 represents a side elevation of the holder constituting this invention.

Fig. 2 is a vertical section taken on the line 2—2 of Fig. 1 with parts in elevation.

Fig. 3 is a vertical longitudinal central section taken on the line 3—3 of Fig. 2; and Fig. 4 is a top plan view.

In the embodiment illustrated a casing 1 is shown preferably made pear-shaped in form and adapted to receive a suitable quantity of powdered chalk or other coating substance. The smaller end 2 of this casing has a threaded neck 3 to receive a screw threaded closure cap 4 which is equipped with a line holding clip 5. This cap 4 is shown knurled on its edges to facilitate its application and removal. The top of the cap is provided with an aperture 6 arranged at one side of the center thereof for the passage therethrough of the line 10. This line 10 is secured at one end to a reel 7 mounted to rotate in the casing 1 at its larger end. A removable axle or shaft 8 supports the reel 7 and extends transversely through the casing from one side to the other having a kerfed head 9 at one end and a reduced threaded portion 11 at the other end which is engaged with the reel end which is in the form of a plate 12 fixedly secured to said reel so that on the rotation of the plate the shaft 8 and the drum or reel 7 carried thereby will be turned for winding up the line 10 thereon as is shown clearly in Figs. 2 and 3. The side of the casing against which the rod end 9 abuts has an apertured boss 1ª on its outer face to reinforce the casing at this point. A hinged arm 13 is mounted on the plate 12 and is provided at its free end on its inner face with a laterally extending stud 14 designed to enter an aperture 15 in plate 12 when said arm is folded. This arm 13 is designed to be opened into the position shown in Figs. 1 and 2 and the stud used as a finger grip for turning the plate 12 and reel 7 for winding up the line 10 on the reel.

In the use of this device as the line 10 is unwound it passes through the chalk in the casing 1 and will thus become coated. After the line has been drawn out the desired distance it is slipped under the clip 5 which will securely hold it against further unwinding and thus enable one man to use the line which ordinarily requires two men.

The arrangement of the aperture 6 at one side of the center of cap 4 provides for the feeding of the line 10 parallel with the periphery of drum 7 to avoid tangling of the line.

The side of the casing 1 opposed to that in which the head of shaft 8 is mounted has an opening 16 sufficiently large to permit drum 7 to be inserted therethrough the plate 12 forming one end of the drum and being of a size to overlap the walls of the opening 16 to limit the insertion of the drum which is held in place by the shaft 8 having its threaded terminal 11 engaged with the drum head or plate 12. It will thus be seen that to remove the drum for repairs of otherwise all that is necessary is to unscrew the rod or shaft 8 and lift the drum bodily from the casing.

The pear-shaped formation of the casing adapts the smaller end thereof to be used as a handle for manipulating the holder.

Various changes in the form, shape proportion and other minor details of construction may be made without departing from the principle or sacrificing any of the advantages of the claimed invention.

I claim:—

A self chalking chalk line means comprising a flat pear-shaped casing having an apertured boss in one face below its transverse median line, the opposed face having a comparatively large opening therein, a cylindrical line carrying reel removably inserted through said opening and mounted in said casing with its outer end provided with a plate projecting radially over the side walls of the reel and closing said casing opening, a removable headed rod extending through said casing and reel, said rod passing through said apertured boss with its head abutting the outer face of the boss and the other end thereof having threaded engagement with said plate so that the reel may be removed by removing said rod, the smaller end of said casing having a threaded neck with a screw threaded cap mounted thereon and provided with an aperture for the passage of a line therethrough, said cap having a line holding clip extending from its edge and contacting with said casing.

In testimony that I claim the foregoing as my own, I have hereunto affixed my signature.

ELISHA ASBURY CONWAY.